Sept. 1, 1970          T. L. SLETTEN          3,526,025
SPLIT PIN INSERT LOCK
Filed Jan. 29, 1968          2 Sheets-Sheet 1
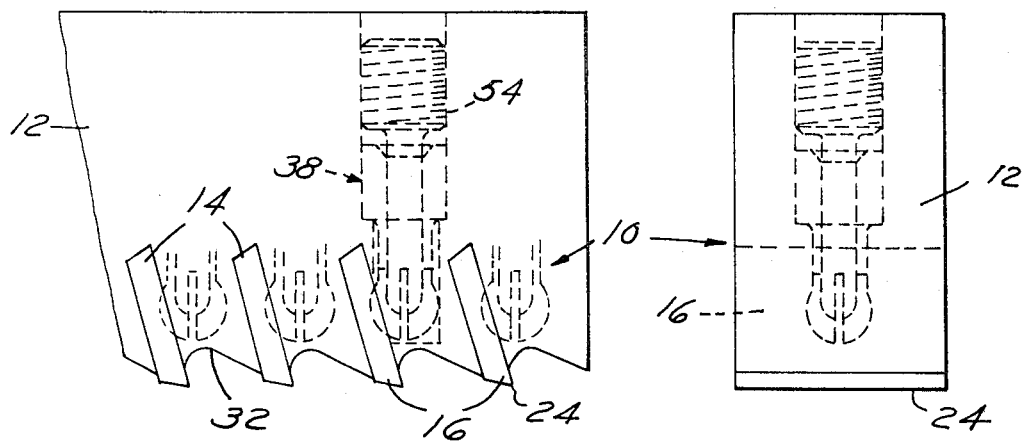
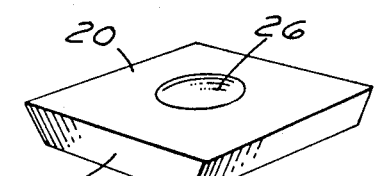
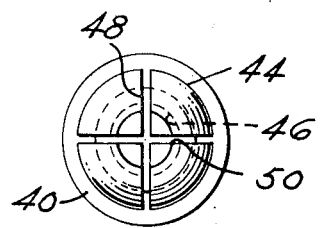
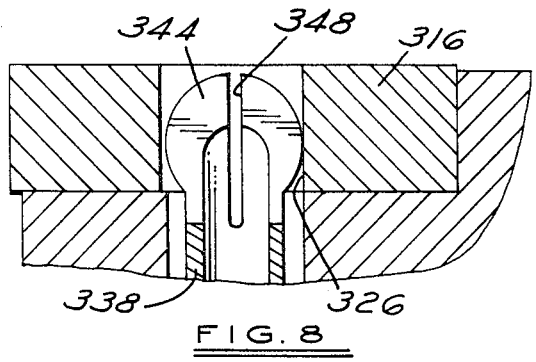
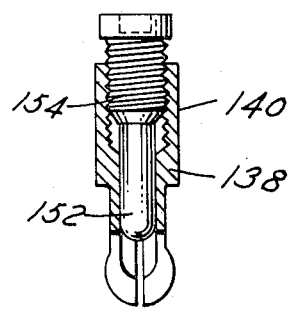
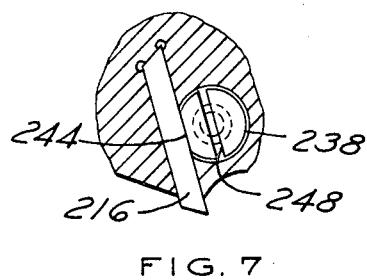
INVENTOR.
TERRY L. SLETTEN
BY
ATTORNEYS

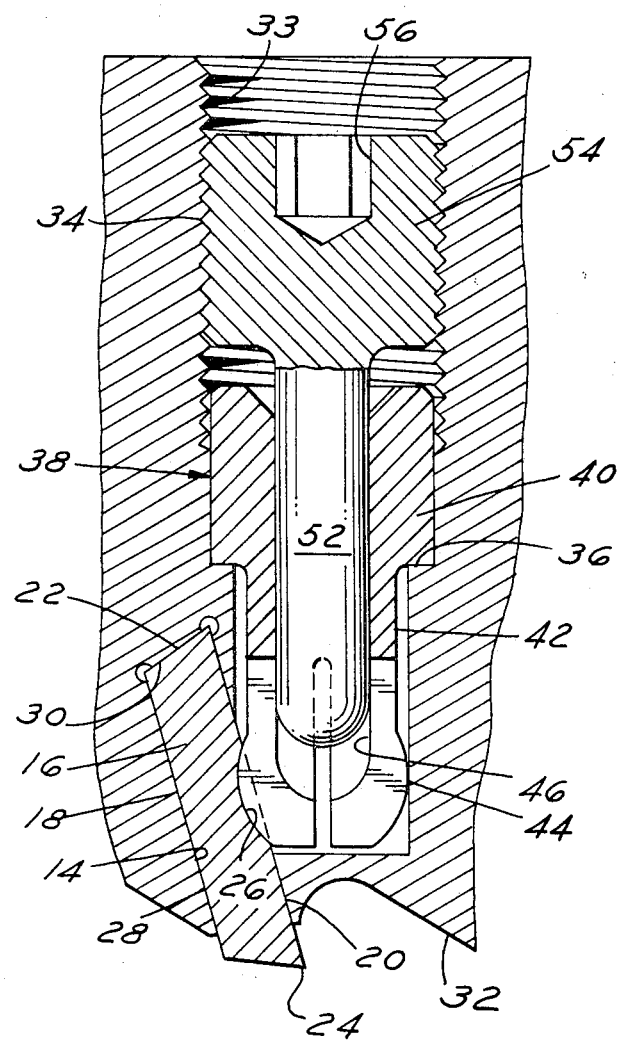

United States Patent Office 3,526,025
Patented Sept. 1, 1970

3,526,025
SPLIT PIN INSERT LOCK
Terry L. Sletten, Westland, Mich., assignor to The Valeron Corporation, a corporation of Michigan
Filed Jan. 29, 1968, Ser. No. 701,151
Int. Cl. B26d *1/04, 1/00;* B23p *15/42*
U.S. Cl. 29—95.1                                11 Claims

ABSTRACT OF THE DISCLOSURE

Means for holding a replaceable cutting insert on a holder, particularly suited for broaches, and including a small pin with a bulbular end received in a bore hole intersecting the insert seat, and wherein the bulbular end of the pin is slit longitudinally and is spread laterally by means received within the slit end to establish locking engagement with a cutting insert on the insert seat.

BACKGROUND OF THE INVENTION

In broaching tools, the closer the cutting teeth of a broach are spaced the greater the possible depth of cut for a given work stroke, or the lesser the stroke required for a given depth of cut. This, in turn, may mean the use of a less expensive broaching machine for a given job. As a consequence, solid or brazed cutters with closely spaced teeth are often used instead of broaches with replaceable inserts, which are more serviceable, because the latter require a greater spacing between the cutting teeth to accommodate conventional wedge locking means to retain the inserts on their holder.

Although some wall space must be provided between replaceable insert cutters in a broach, to provide a solid back wall seat, the presently known type of flat wedge applied from the cutting face of the broach requires almost twice the space necessary to serve this function because of its angle of inclination relative to the insert and to afford operating clearance with respect to the next adjacent insert.

There is a need for an insert locking arrangement for broaches which can be provided within a relatively small space and, preferably, which may be applied from other than the working face of the tool and still obtain the shoulder holding force necessary to retain a replaceable insert securely seated in a receptive slot in an accommodating holder part.

SUMMARY OF THE INVENTION

This invention relates to insert holding means cutting tools in general and more particularly to broaches and means for retaining a plurality of replaceable inserts in closely spaced relation therein.

In the embodiment of this invention hereinafter shown and described, a wedge locking pin is used within a bore hole intersecting the insert seat from a top or side wall face of the holder. The locking pin is formed to include a center hole and has the end which engages the insert slit longitudinally and in a manner which causes it to spread laterally and lock up the insert upon axial adjustment of a smaller pin member within the center hole and when it is moved towards the slit end thereof.

The locking pin is relatively small in diameter and is provided in a bore hole inclined as necessary to extend within the wall space between next adjacent insert slots. It does not materially weaken the wall strength on the supporting side of the cutter, because of its small size and since it does not extend through the cutting face of the tool. As formed for facial engagement with the insert, within a depression formed in an upper disposed face wall of the insert, the locking force in spreading the slit end of the pin is used to both hold the insert on its seat and back up in the pocket slot against the back shoulder wall.

The small center pin, within the locking pin member, may have threaded engagement with the bore hole wall or with the locking pin to obtain the axial adjustment necessary to spread or release the slit end of the pin and to lock or release an insert, as desired.

Other variations of the invention include use of slit or split-end pin for other wedge locking purposes, as with cutting tools using inserts with center holes, and in providing any means, from within or outside of the pin, for spreading it laterally and making use of the displacement of a part thereof for insert retaining purposes.

DESCRIPTION OF THE DRAWINGS

FIG. 1 is a side elevation of a broaching tool showing the close spacing of replaceable cutting inserts obtained in the practice of this invention;

FIG. 2 is an end view of the broaching tool;

FIG. 3 is an enlarged perspective view of an insert removed from the broaching tool;

FIG. 4 is a greatly enlarged cross-sectional view through a fragmentary part of the broach through one of the insert slots.

FIG. 5 is an end view of the slit end of the locking pin;

FIG. 6 is a cross-sectional view of another form of wedge locking pin;

FIG. 7 shows another form of split pin wedge lock for plane surfaced inserts; and FIG. 8 is a cross-sectional view of a wedge lock adaptation for inserts with center holes.

DETAILED DESCRIPTION

A part of a broach 10 is shown in the first drawing figure. It includes a holder part 12 having a series of inclined slots 14 provided in and across its bottom wall and a replaceable cutting insert 16 in each slot.

The cutting inserts are rectangular and of substantially the same width as the holder, as shown by the end view of broach 10, in FIG. 2. They are of the positive rake type with parallel end wall faces 18 and 20, inclined side walls 22 and cutting edges 24. In addition, the inserts have a dimple-like depression 26 formed centrally within their larger end wall face, as used in the first embodiment of the present invention which will be described.

The insert slots 14 are sized to receive the cutting inserts 16 in closed fitted engagement therein and are just enough oversized to permit them to be removed and indexed, or replaced, as necessary. They have a planar back wall 28, at an angle, that serves as the insert seat and a shoulder wall 30, at the inner end of the slot, which is formed to complement the inclination of the cutters' side walls and orient the cutting edge that extends beyond the slot opening.

The underside of the holder wall between each insert slot is undercut, as at 32, for chip clearance, but is otherwise a solid wall without any wedge locking means provided therein.

Within the holder 12, over each of the insert reseptive slots 14, is provided a small bore hole 33. The hole extends straight down and intersects the slots on the side across from the insert seating back wall 28. It is threaded at its upper end, as at 34, and formed to include a shoulder wall 36 lower down and nearer the side opening into the insert slot.

A wedge-locking member 38 is provided in each bore hole, down in the lower end, and is formed with an end 40 for engagement with the shoulder wall 36, a narrower neck portion 42, and a bulbular end 44 that is disposed next to the opening into the insert slot. It also includes a center hole 46 that extends from its larger end into the bulbular part. The bulbular part is slit crosswise and longitudinally, as by the cross slits 48 and 50, shown best in FIG. 5, and the end quadrants are compressed to cause contraction of the side walls inwardly and reduce the size of the center hole in the split end.

In the center hole 46 of the wedge locking member 38 is a center pin 52 which is adapted to extend into the bulbular part and to spread the slit or split end apart. It includes a larger part 54 which has threaded engagement with the walls of the hole over the wedge locking member, and it has a socket hole 56 in its upper face to afford means of axially adjusting the center pin in the center hole.

In the embodiment shown, the wedge locking member 38 is made with the bulbular end 44 adapted to have relatively close fitting engagement in the lower end of the bore hole 33 before the pin 52 is received therewithin. As the actuating pin 52 is adjusted downwardly into the wedge-locking member, it will hold the wedge locking member against the shoulder wall 36 in the bore hole and cause the split end of the locking pin to spread laterally and into holding engagement with the insert. The insert slot is formed so that the insert 16 will have the dimple depression 26 disposed for engagement by the bulbular end 44 of the wedge-locking member, on what is the high side of the depression, as disposed in the bore hole, and, consequently, the locking pressure is applied both against the insert seating back wall 28 and upwardly against the back shoulder wall in the pocket 30.

In the lower most disposition of the center pin 52 in the locking pin 38, both pins will flex laterally, following the initial seating of the insert, as necessary for engagement with the opposite wall of the bore hole to obtain a positive reactionary wedge locking load.

It will be appreciated that the bore hole 33 and wedge-locking pin 38 require only a very small amount of space between next adjacent insert slots and accordingly enable them to be spaced much closer together than the conventionally known type of flat wedge lock provided within the cutting face of a broach. In addition, the wedge-locking means can be provided at an angle, through a side wall of the holder, and otherwise, with the inserts straight or at an angle in the holder, with the same or greater advantage.

In FIG. 6, a variation of the wedge-locking means is shown with a wedge-locking pin 138 formed to include a longer shank end 140 and with the center hole pin 152 including a threaded part 154 having threaded engagement therewithin.

Another variation is shown by FIG. 7 wherein the wedge-locking pin 238 has only one cross slit 248, is applied laterally through a side wall of the holder, and has a flat side on the bulbular end 244 for a flat faced engagement with an insert 216 which does not include the center dimple depression.

FIG. 8 shows another variation of the present invention wherein the bulbular end 344 of a wedge-locking pin 338, with only a single cross-slit 348, is received in a center hole 326 in an insert 316 and wherein the center hole is large enough to permit the spreading force, in enlarging the bulbular end of the pin, to act against one side of the inserts' center hole and apply a shoulder locking pressure thereto.

From the foregoing, it will be appreciated that the split pin wedge locking means of this invention is relatively simple to form and provide and has numerous applications. It is particularly adapted for use in broaches since it allows the use of replaceable cutting inserts in a much closer spaced relationship than has been heretofore attainable. However, it is equally as serviceable in other instances, with plane surfaced or center hole inserts.

Although the center pin actuating means, within the wedge-locking pin, is shown as received within a center hole in the locking pin, and the end of the pin is shown as slit longitudinally through the axis of the center hole, to cause deflection of both sides of the locking pin's end, there are possible off center variations wherein only one side of the pin will be deflected and direction can be given thereto; also, the locking pin may be formed to receive means for spreading it from outside the pin, rather than through a center hole, and still lie within the scope of the invention as defined in the following claims.

What is claimed is:

1. A cutting tool comprising a holder, a replaceable cutting insert, and means for retaining the insert in the holder for use, characterized by;
a seat in the holder for said cutting insert,
a seat in said cutting insert for engagement by said retaining means,
said retaining means including a member fitted in the holder and having an end thereof formed and disposed for engagement with said seat in said insert,
said member being slit longitudinally at the insert engaging thereof,
and means for spreading the slit end of said member for effecting external enlargement thereof and retaining engagement with said insert, and said last mentioned means being received within the slit end of said member through the opposite end thereof, 2. In the cutting tool of claim 1,
a bore hole provided centrally within said member and extending into the slit end thereof,
and said last mentioned means being receptive within said bore hole and being relatively larger than the bore hole extension within said slit end.

3. In the cutting tool of claim 2,
said last mentioned means having threaded engagement within said holder affording means of axial adjustment therefor.

4. A cutting tool including a holder, a replaceable cutting insert for use with the holder, and means for retaining the insert in the holder,
said holder having an insert receiving opening including an insert seat and a bore hole intersecting said opening,
said insert retaining means being provided in said bore hole and including a member having one end formed for engagement with said insert as disposed on said seat and the other end thereof formed for holder engagement within said bore hole,
said member being split longitudinally at the insert engaging end thereof,
and means actuated from the other end for spreading the latter into engagement with said insert and retaining enegagement of said insert relative to said seat.

5. The cutting tool of claim 4, including interengaging shoulders in said bore hole and member for locating said member axially within said bore hole.

6. The cutting tool of claim 5,
said bore hole intersecting said seat at an angle whereby the split end of the retaining member in being spread exerts a force a major component of which is normal to said insert seat.

7. The cutting tool of claim 4,
wherein the split end of said retaining member has reactive engagement with the wall of the bore hole opposite an insert on the seat in the course of being spread apart.

8. The cutting tool of claim 4,
the means received centrally within said retaining member including a pin telescopically received therein and axially adjustable relative thereto.

9. The cutting tool of claim 8,
said pin having threaded engagement with the wall of said holder.

10. A broaching tool including a holder, a plurality of replaceable cutting inserts for use with the holder, and a plurality of insert slots provided in the working face of the holder, said holder having a bore intersecting each of said slots, a retaining element seated in each bore adapted to engage an insert located in working position within said slot and a side wall of said bore opposite said insert engagement, and means for spreading the insert and bore engaging portions of said element for operating retention of said insert.

11. The broaching tool of claim 10 wherein, each of said slots has a seating face and an inner wall for engaging respective insert face and edge surfaces and each of said inserts includes a depression in the face thereof engaged by said retaining elements opposite said seating face for shoulder locking engagement of said inserts relative to the inner wall of said slots and the seating face thereof.

References Cited

UNITED STATES PATENTS

| | | | |
|---|---|---|---|
| 3,056,186 | 10/1962 | Greenleaf | 29—105 |
| 3,121,939 | 2/1964 | Williams | 29—96 |
| 3,320,654 | 5/1967 | Lovendahl | 29—96 |
| 3,393,435 | 7/1968 | Viellet | 29—96 |

HARRISON L. HINSON, Primary Examiner

U.S. Cl. X.R.

29—96, 105

PO-1050
(5/69)

UNITED STATES PATENT OFFICE
CERTIFICATE OF CORRECTION

Patent No. 3,526,025            Dated September 1, 1970

Inventor(s) Terry L. Sletten

It is certified that error appears in the above-identified patent and that said Letters Patent are hereby corrected as shown below:

Column 2, line 59, change "reseptive" to --receptive--.

Column 4, line 19, claim 1, after "engaging" insert --end--.

Column 4, line 50, claim 4, change "enegagement" to --engagement--.

SIGNED AND
SEALED
NOV 17 1970

(SEAL)
Attest:

Edward M. Fletcher, Jr.
Attesting Officer

WILLIAM E. SCHUYLER, JR.
Commissioner of Patents